United States Patent Office 3,125,565
Patented Mar. 17, 1964

3,125,565
DISAZO DYES
Ermanno Gaetani, Milan, Italy, assignor to Aziende Colori Nazionali Affini Acna S.p.A., Milan, Italy, a corporation of Italy
No Drawing. Filed Apr. 14, 1960, Ser. No. 22,127
Claims priority, application Italy Mar. 7, 1960
4 Claims. (Cl. 260—191)

An object of the present invention is certain new water insoluble disazo dyes of the general Formula A:

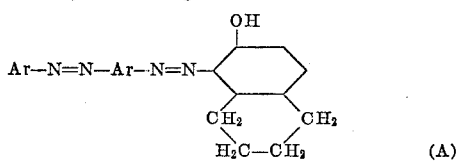

(A)

wherein Ar is an aromatic nucleus, preferably benzene, further substituted with a lower alkyl radical.

The dyes of the above mentioned general Formula A are suitable for direct dyeing of polyolefinic materials by simple application at the boiling temperature of the dyeing bath.

Among the dyes of general formula A, the following dyes have shown to be particularly suitable in the dyeing of polypropylene and polyethylene materials:

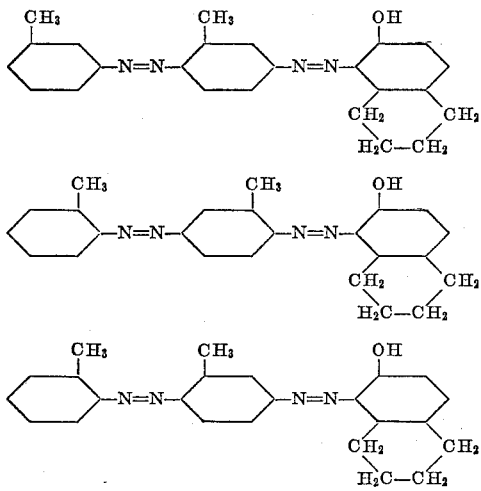

The compounds of the general Formula A, are obtained by coupling in the presence of a strong base, one mol of an amino azo compound of the type:

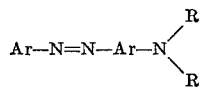

wherein Ar has the above mentioned meaning and R is hydrogen, with one mol of a compound having the formula:

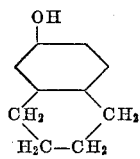

The following examples will further illustrate the invention without limiting its scope. (All parts are by weight unless otherwise indicated.)

Example 1

22.5 g. 4-amino-3,2'-dimethylazobenzene are diazotised in a conventional manner and the diazoazo compound obtained is added to a solution of tetrahydro-β-naphthol (prepared with 16 g. of coupling agent in 200 g. water, 15 g. sodium hydroxide solution (36° Bé.) and 35 g. 30% ammonia solution). The coupling reaction is very rapid. The precipitated disazo dye is filtered, washed until neutral and dried.

The dye thus obtained is a brown yellow powder (melting point: 138° C.) having the formula:

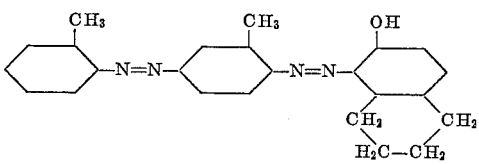

Upon examination by paper chromatography, this dye gives an uniform orange spot which remains unaltered upon treatment with acids and turns slightly more red with alkalies.

Examples 2–3

Employing the same method as Example 1, but starting with 4-amino-2,3'-dimethyl-azobenzene and 4-amino-2,2'-dimethyl-azo-benzene, orange colored dyes, having similar properties and a slightly more yellow shade are obtained.

Having thus described the invention, what I desire to secure and claim by Letters Patent is:

1. A disazo dye insoluble in water selected from the group consisting of the dyes of the formulae:

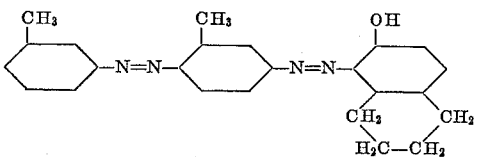

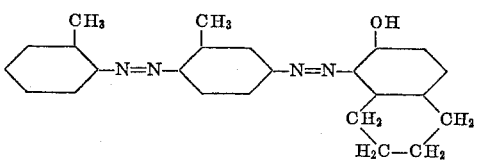

and

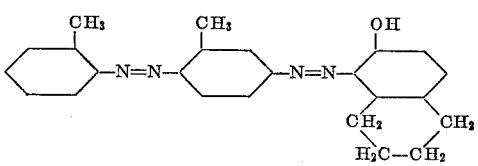

2. A disazo dye, insoluble in water, having the following formula:
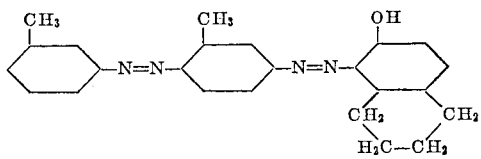
3. A disazo dye, insoluble in water, having the following formula:
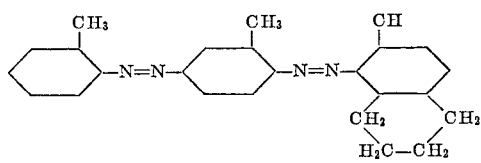
4. A disazo dye, insoluble in water, having the following formula:
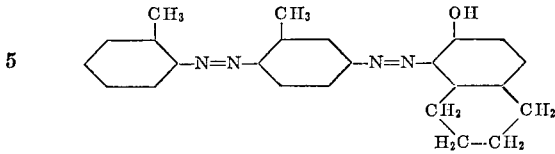
References Cited in the file of this patent
Colour Index, 2nd edition, vol. 3, page 3207, vol. 2, pages 2850–2851, C.I. 26, 105, 26, 110 (1956).